Sept. 9, 1941.   C. L. OSBORN   2,255,393
WINDSHIELD CLEANER
Filed March 28, 1940   2 Sheets-Sheet 1
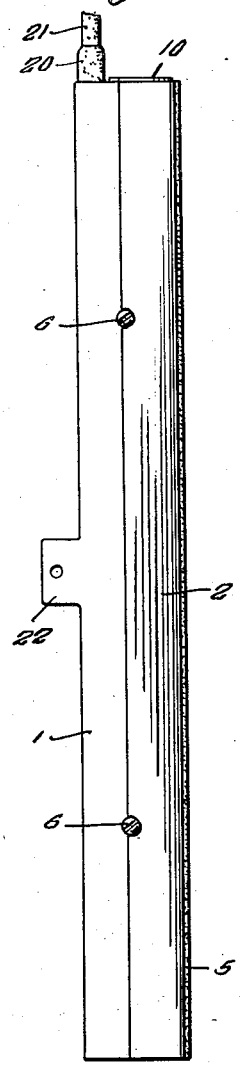
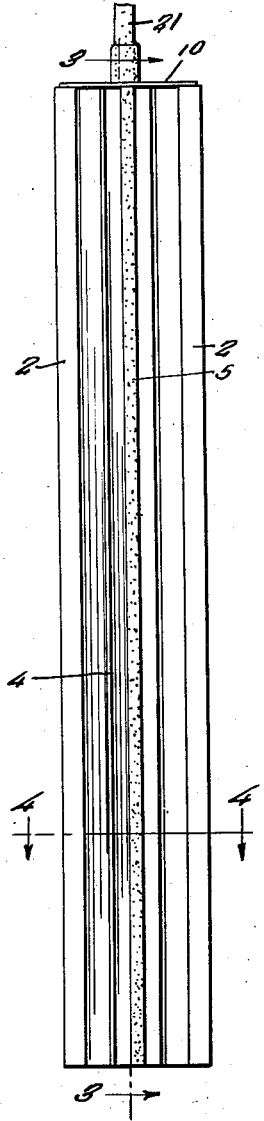
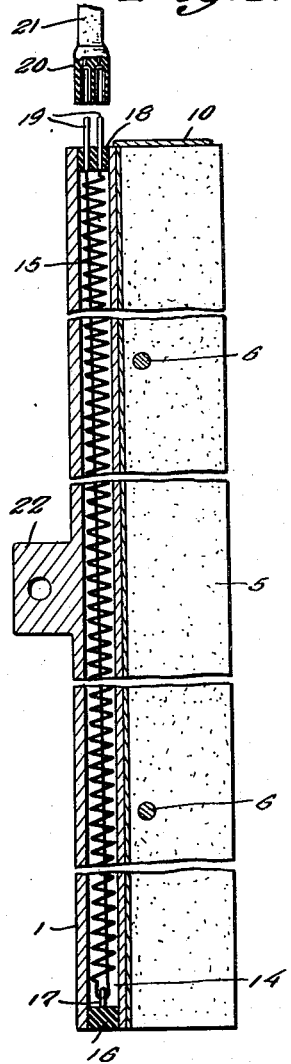
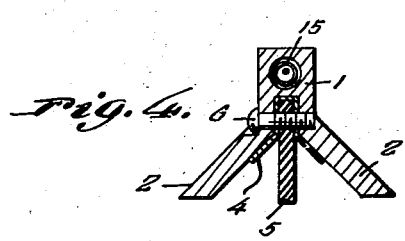
Inventor
Charles Lee Osborn
By Clarence A. O'Brien
Attorney Sept. 9, 1941.                C. L. OSBORN                2,255,393
                            WINDSHIELD CLEANER
                          Filed March 28, 1940            2 Sheets-Sheet 2
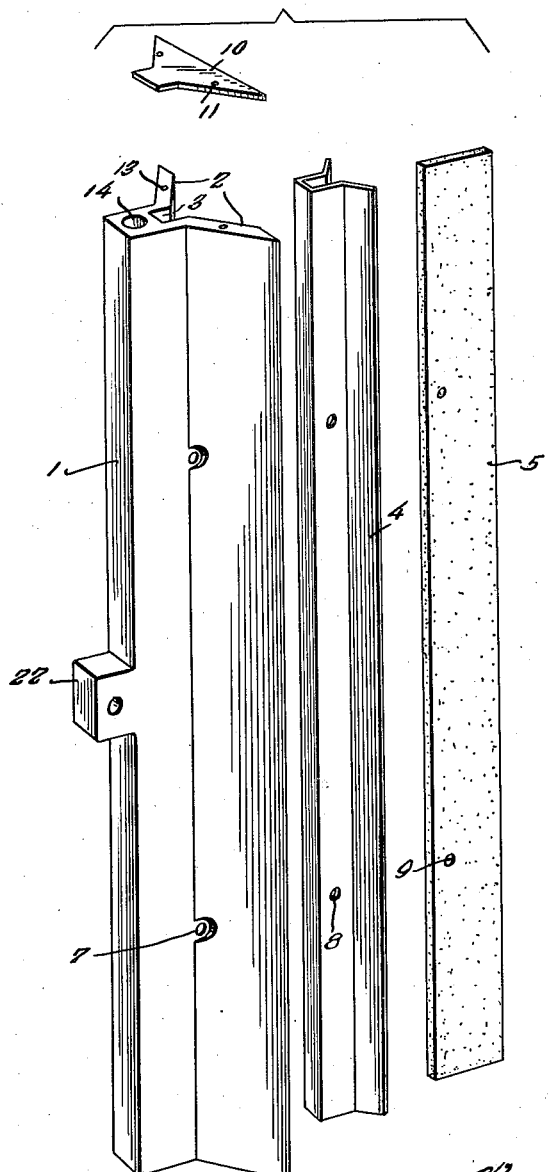
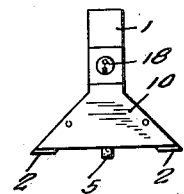
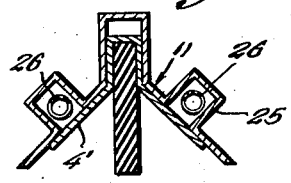
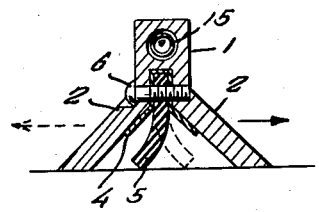
Inventor
Charles Lee Osborn
By Clarence A. O'Brien
Attorney Patented Sept. 9, 1941

2,255,393

UNITED STATES PATENT OFFICE 2,255,393

WINDSHIELD CLEANER

Charles Lee Osborn, Cheyenne, Wyo.

Application March 28, 1940, Serial No. 326,489

4 Claims. (Cl. 15—250)

This invention relates to a windshield wiper or cleaner, the general object of the invention being to provide a device of this nature having diverging blades for cutting and scraping ice and other matter from the windshield and a resilient member located between the blades for wiping the windshield, with electric heating means for the device for preventing snow or ice from sticking to the parts.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side view of the improved device.

Figure 2 is a view looking into the same.

Figure 3 is a section on the line 3—3 of Figure 2.

Figure 4 is a section on the line 4—4 of Figure 2.

Figure 5 is a view showing the parts of the device separated and in perspective.

Figure 6 is a top plan view of the device.

Figure 7 is a view similar to Figure 4 but showing how the parts move during the operation of the device.

Figure 8 is a transverse sectional view showing a modification.

In these views the numeral 1 indicates the body of the device, the major portion of which is of substantially rectangular shape and it is formed with the diverging blades 2 which have beveled edges which will flatly engage the glass surface of a windshield when the device is in use as shown in Figure 7, each corner of this side edge forming a cutting edge. At the base of the blade the body is formed with a channel 3 in which fits the channel part of a strip 4, preferably of copper with its side parts diverging and resting against the inner faces of the blades 2. A strip 5 of rubber or the like fits in the channel part of the strip 4 and the strip 5 is of such a width as to project from the space formed by the blades 2 when the strip 5 is in a straight position as shown in Figure 4. Screws 6 pass through the body at the point where the channel 3 is formed and through the channel part of the strip 4 and through the strip 5, the body having the holes 7, the strip 4 having the holes 8 and the strip 5 having the holes 9 therein for the passage of these screws. The upper end of the space formed by the channel 3 and the blades 2 is covered by a thin metal plate 10 which is fastened to the blades by screws passing through holes 11 in the plate 10 and the holes 13 in the upper ends of the blades 2.

A bore or passage 14 passes through the rectangular part of the body 1 for receiving the heating coil 15 and one end of the bore or passage is closed by a plug 16 of non-conducting material which carries a hook 17 to which one end of the coil is connected and a plug 18 of non-conducting material closes the top end of the bore and carries the prongs 19 which form the terminals of the coil and the return wire, as shown in Figure 3, these prongs being adapted to be inserted in the socket part 20 connected to one end of a conductor 21 which leads to the battery or other source of current of the device or vehicle on which the invention is used. A projection 22 is formed on the body 1 for receiving the arm of the actuating means, the connection between the device and the arm being of any suitable kind.

As will be seen especially from Figure 7, as the device moves over the windshield surface in one direction the rubber blade 5 is bent to firmly engage the glass while the front corner of the forward blade 2 acts as cutting and scraping means for removing snow, ice or other matter from the glass while the forward corner of the rear blade 2 also acts as cutting and scraping means. Of course, when the device moves in an opposite direction the opposite corners of the blades do the cutting and scraping. The electric heating means will heat the parts to prevent ice and snow sticking to the same and also facilitate the removal of ice and snow from the windshield by the device.

The copper strip will facilitate the passage of the heat from the main part of the body to the blades and to the rubber strip.

In the modification shown in Figure 8, the body 1' of the device is formed of comparatively thin metal and this body is formed with a channel part 25 on each blade forming part and these channels are closed by the limbs of the strip 4' and each channel contains a heating coil 26 so that two of these coils are used for heating the device. In other respects this form of the invention is similar to that above described.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A windshield cleaner of the class described comprising a body having diverging blade forming members and a channel therein at the base of said members, a metal strip of high thermal conductivity bent into channel shape for fitting in the channel with its side parts flaring to rest against portions of the inner faces of the blade members, a resilient strip fitting in the channel of the strip and extending through the space formed by the blade members, fastening means passing through the body for holding the resilient strip and the channel strip in place, and a plate for covering the upper end of the space formed by the blade members, a bore passing through the body longitudinally and having its ends closed by plugs of insulating material, a heating coil in the bore and connected with the plugs and means for connecting the coil to a source of electricity.

2. A windshield cleaner comprising a body having diverging parts, the free edges of which are formed to provide cutting and scraping edges, each diverging part having a longitudinally extending channel therein opening out into the space formed by said diverging parts, a channel strip formed of a metal of high thermal conductivity having a channel part fitting in the body and provided with flaring parts contacting the inner faces of the diverging parts and closing the channels in said diverging parts, a resilient strip having one side edge portion fitting in the channel of the channel strip and passing through the space formed by the diverging parts of the body and a heating coil in each channel of the diverging parts.

3. A windshield cleaner comprising: an elongated body; two parallel, longitudinal, outwardly-flared blades projecting from said body to engage the surface of a windshield, there being a longitudinally extending groove in said body between said blades; an elongated channel member formed of a metal of relatively high thermal conductivity lying in said groove with its open edge directed between said blades, the sides of said channel member being flared outwardly to engage said blades; an elongated, resilient wiper member, one longitudinal edge of which is secured in said channel member, the other edge projecting between said blades to contact said windshield; and electrical heating means carried by said body in proximity to said channel member, the latter acting to conduct heat from said heating means to both said blades and to said wiper member.

4. A windshield cleaner comprising: an elongated body; two parallel, longitudinal, outwardly-flared blades projecting from said body to engage the surface of a windshield, there being a longitudinally extending groove in said body between said blades; an elongated channel member formed of a metal of relatively high thermal conductivity lying in said groove with its open edge directed between said blades, the sides of said channel member being flared outwardly to engage said blades; an elongated, resilient wiper member, one longitudinal edge of which is secured in said channel member, the other edge projecting between said blades to contact said windshield; a channel in each blade having an open side facing said wiper member, the open sides thereof being closed by the flared sides of said channel member; and electrical heating coils mounted in said channels, said channel member acting to conduct heat from said coils to said blades, the wiper member and the area between said blades.

CHARLES LEE OSBORN.